(12) United States Patent
Lacock et al.

(10) Patent No.: US 7,882,449 B2
(45) Date of Patent: Feb. 1, 2011

(54) PROVIDING SUITABLE MENU POSITION INDICATORS THAT PREDICT MENU PLACEMENT OF MENUS HAVING VARIABLE POSITIONS DEPENDING ON AN AVAILABILITY OF DISPLAY SPACE

(75) Inventors: Tyler S. Lacock, Morrisville, NC (US); Jake Palmer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/939,192

(22) Filed: Nov. 13, 2007

(65) Prior Publication Data

US 2009/0125845 A1 May 14, 2009

(51) Int. Cl.
*G06F 3/048* (2006.01)
(52) U.S. Cl. ............... 715/810; 715/841; 715/835; 715/765
(58) Field of Classification Search ............ 715/764, 715/765, 744, 781, 788, 789, 798, 799, 810, 715/811, 817, 835, 841, 846
See application file for complete search history.

(56) References Cited

U.S. PATENT DOCUMENTS

| | | | |
|---|---|---|---|
| 6,133,915 A * | 10/2000 | Arcuri et al. | 715/779 |
| 2002/0054146 A1* | 5/2002 | Fukumoto et al. | 345/810 |
| 2003/0038848 A1* | 2/2003 | Lee et al. | 345/810 |
| 2004/0230916 A1* | 11/2004 | Salvatori et al. | 715/810 |
| 2005/0091641 A1* | 4/2005 | Starbuck et al. | 717/122 |
| 2006/0214935 A1* | 9/2006 | Boyd et al. | 345/473 |
| 2006/0218506 A1* | 9/2006 | Srenger et al. | 715/810 |
| 2008/0122870 A1* | 5/2008 | Brodersen et al. | 345/634 |

* cited by examiner

*Primary Examiner*—X. L Bautista
(74) *Attorney, Agent, or Firm*—Patents on Demand, P.A.; Brian K. Buchheit; Scott M. Garrett

(57) ABSTRACT

The present invention discloses a solution for using menu position indicators to accurately show where an intelligently placed menu will appear. Positioning of menus can automatically vary in the solution depending upon available screen space and an origin point for the menu. A menu position indicator can include a graphical image capable of indicating a direction of the menu appearance, such as an arrow or triangle. The menu position indicator for a menu can change depending upon a position of an origin point and depending upon available screen space for displaying the associated menu. When a position of a main menu changes, calculations can be performed to determine where a submenu of the main menu will be presented, and the menu position indicator can be adjusted accordingly.

19 Claims, 3 Drawing Sheets

PROVIDING SUITABLE MENU POSITION INDICATORS THAT PREDICT MENU PLACEMENT OF MENUS HAVING VARIABLE POSITIONS DEPENDING ON AN AVAILABILITY OF DISPLAY SPACE

BACKGROUND

1. Field of the Invention

The present invention relates to the field of graphical user interfaces and, more particularly, to providing suitable menu position indicators that predict menu placement of menus having variable positions depending on an availability of display space.

2. Description of the Related Art

Menus are an important and heavily used part of graphical user interfaces. Menu and submenu behavior frequently follows conventions based on their menu type. In general, menus have an established origin point and are positioned within an interface relative to this point. For fixed menus, the origin point is usually defined by a fixed GUI element, such as a menu bar. For context menus, the origin point is usually defined by a position of a pointer when the context menu was initiated. Most, but not all, menus use the origin point as the upper left point of a menu position. Some menus, for example, that originate from a bottom docked bar use the origin point as the bottom left position of the menu. Other menus that originate from a right docked bar use the origin point as the top right position of the menu.

Menus can include certain actions associated with additional levels of options, each level being associated with a submenu. A menu typically denotes submenu availability by displaying an indicator in the form of a small black arrow, or less commonly, an ellipsis. Generally, fixed menus, context menus, and submenus behave similarly and in a manner consistent with user expectations. However, in many instances, when screen space is not available for menus to behave "normally", unanticipated behavior can result. For example, menus that appear to the right of an origin point when space is available often expand to the left when there is not sufficient screen space to the right. Not only is a user sometimes surprised by where menus appear, submenu indicators often add to this confusion by indicating default positions, which are different from an actual position of a presented submenu.

SUMMARY OF THE INVENTION

The present invention discloses a solution for using menu position indicators to accurately show where an intelligently placed menu will appear. Positioning of menus can automatically vary in the solution depending upon available screen space and an origin point for the menu. A menu position indicator can include a graphical image capable of indicating a direction of the menu appearance, such as an arrow or triangle. The menu position indicator for a menu can change depending upon a position of an origin point and depending upon available screen space for displaying the menu. When a position of a main menu changes, calculations can be performed to determine where a menu will be presented, and the menu position indicator can be adjusted accordingly.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
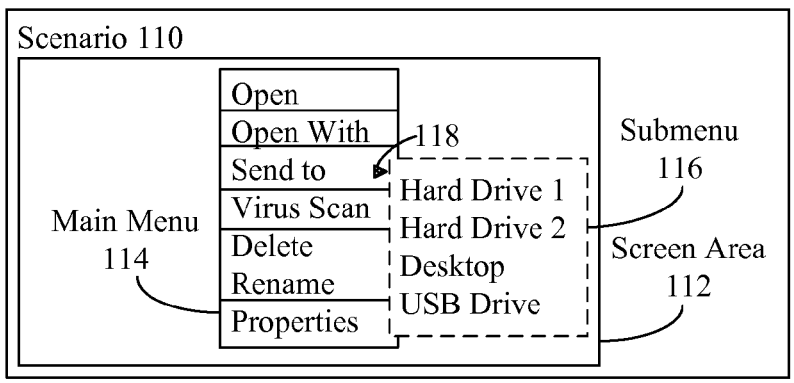
FIG. 1 is a schematic diagram illustrating a set of scenarios for menu position indicators that dynamically adjust to show a position where a menu having more than one possible display position is to appear.
Figure 1:
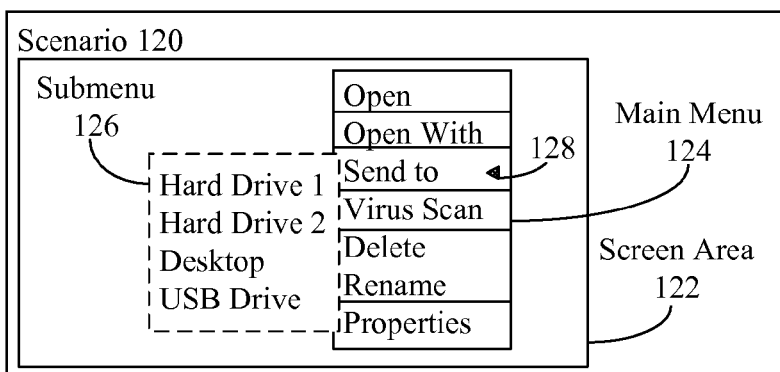
Figure 1:
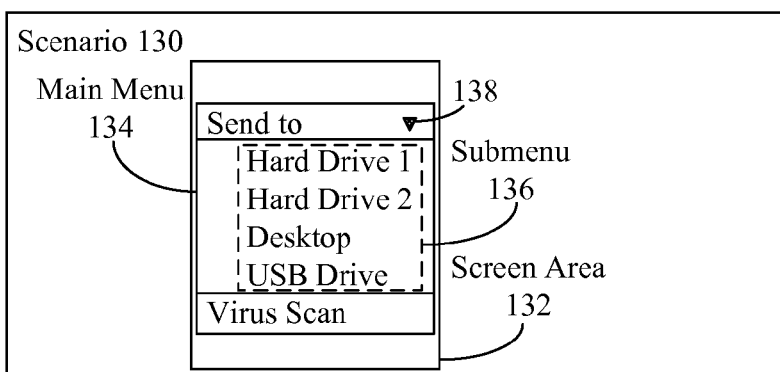
Figure 1:
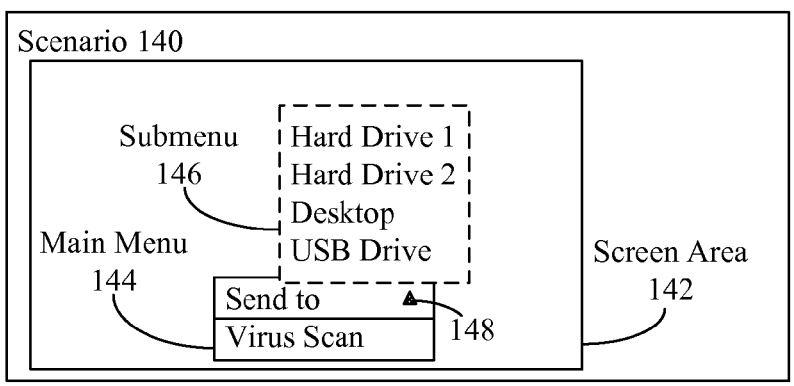

FIG. 1 is a schematic diagram illustrating a set of scenarios 110-140 for menu position indicators that dynamically adjust to show a position where a menu having more than one possible display position is to appear. Scenarios 110-140 illustrate a context menu 114, 124, 134, 144 for a file manager application and an associated submenu 116, 126, 136, 146. The scenarios 110-140 show a variable placement of the submenu 116, 126, 136, 146 based upon a position of the main menu 114, 124, 134, 144 relative to the screen area 112, 122, 132, 142 of a display. Positions indicated by menu indicators 118, 128, 138, and 148 are predictive in nature and anticipate a positioning of a related menu 116, 126, 136, 146 when activated.

Use of a file manager application is arbitrary and technique illustrated can be applied to any application context. Further, the technique is not limited to context menus, but can apply to any situation in which a menu is to appear in a location shown by a menu presentation indicator. For example, when a menu is to appear proximate to a pointer/cursor (e.g., right mouse clicking to call up a menu of options, for example) the pointer/cursor can include a menu presentation indicator to indicate where the submenu 116, 126, 136, 146 is to appear.

The scenarios 110-140 present four menu positions and menu position indicators 118, 128, 138, and 148 based on available screen area. In the scenarios 110-140, menu locations can be indicated by triangles pointing in one of four possible directions, above, below, left, and right. Menu position indicators 118, 128, 138, and 148 can denote the location where the associated menu can appear.

Scenario 110 illustrates a typical default menu position indicator and position for submenus. In scenario 110, menu position indicator 118 can inform the user of the location of submenu 116 appearance. When screen area 112 is available to the right of the main menu 114, submenu 116 can be presented. For example, menu position indicator 118 is consistent with the location of the "send to" menu 116 presented alongside menu 114.

In scenario 120, screen area 122 is inadequate to present submenu 126 to the right of main menu 124, the default location. In this situation, submenu 126 can be presented to the left of a menu 124. Before submenu 126 is presented, menu position indicator 128 can indicate the expected location of submenu 126. For example, when a user interacts with the "send to" menu entry, the user can expect the location of submenu 126 based on the direction menu position indicator 128 is pointing.

In scenario 130, a submenu 136 can be presented hierarchical inline manner to main menu 134. Scenario 130 presents a menu 134 constricted by minimal screen area 132. Menu position indicator 138 can be used to present the expected location of submenu 136. When a user interacts with the "send to" menu entry, main menu 134 can be expanded to fit submenu 136, as shown. For example, an application executing on a mobile device can present a submenu 136, consistent with information given by menu position indicator 138 and allowing convenient access to submenu 136 entries. Selecting the menu position indicator 138 or a region of the send to option can toggle a presentation state of the submenu 136 causing a previously expanded submenu 136 to collapse, thereby restoring a presentation to only main menu 134 options.

Scenario 140 illustrates a submenu 146 appearing above main menu 144. Menu position indicator 148 can inform a user of the expected location of submenu 146. As shown, a context menu 144 presented at the bottom of screen area 142 can appear to grow upward. When main menu 144 appears to grow upward, submenu 146 position can behave in a consistent manner to its parent window, appearing above menu 144. Menu position indicator 148 can allow the user to verify expected location of submenu 146 before submenu 146 is presented.

In system 100, submenus 116, 126, 136, and 146 position can be affected by user settings, system level preferences, application level preferences, and the like. Menu position indicators 118-148 can include, but are not limited to, arrows, geometric shapes (e.g. triangle), non-uniform shapes, icons, and other indicators capable of denoting menu position. Scenarios 110-140 are for illustrative purposes only and should not be construed to limit the invention in any regard.

Figure 2:
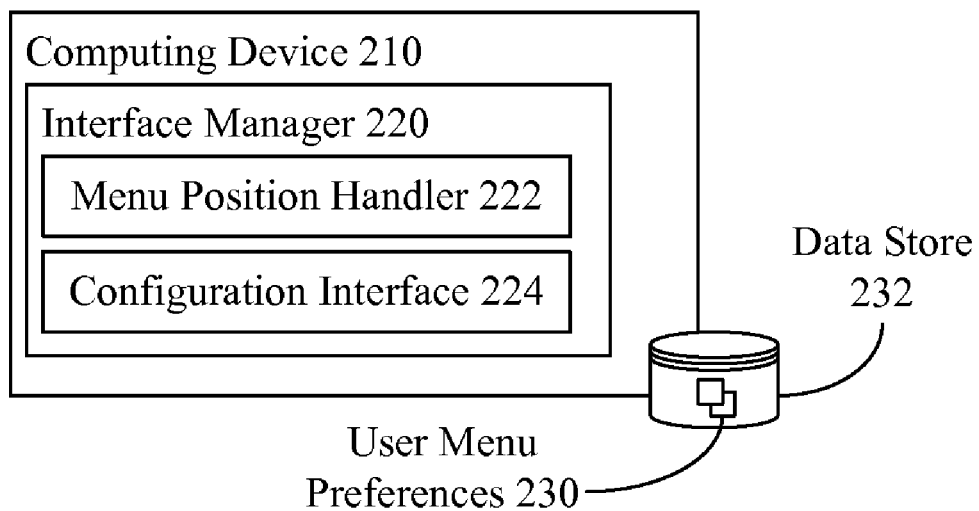
FIG. 2 is a schematic diagram illustrating a system for self-adjusting menu position indicators in accordance with the embodiment of inventive arrangement disclosed herein.

FIG. 2 is a schematic diagram illustrating a system 200 for self-adjusting menu position indicators in accordance with the embodiment of inventive arrangement disclosed herein. System 200 represents one hardware/software structure within which the scenarios 110-140 can be implemented.

In system 200, an interface manager 220 on a computing device 210 can be utilized to present menus and associated menu position indicators to a user. Menu position indicators can denote the location where a related menu can appear. The interface manger 220 can be a software program configured to handle interface aspects of device 210, including menu behavior. The menu position handler 222 can be a software program that anticipates a positioning of a menu or submenu associated with menu position indicator and dynamically changes the menu position indicator to match the anticipated position. Menus indicated by a menu indicator can be main menus appearing from a visually represented origin point, can be a submenu of a main menu, or can be a child submenu of a parent submenu.

Based on stored user menu preferences 230 in data store 232, menu positioning behavior can be altered. For example, user preferences can indicate a default position for placing a menu, a priority order of positioning preferences should more preferred placements not be possible, a refresh rate for determining a proper menu position indicator, a visual characteristic of a menu position indicator, and the like. The user preferences 230 can be established and/or modified using configuration interface 224.

As shown herein, computing device 210 can be a hardware/software device capable of performing actions based on user interaction that involve a presentation of menus. Computing device 210 can include, but not limited to, desktop computer, laptop, mobile phone, mobile computing device, personal digital assistant (PDA), a media player, an entertainment system, a virtual computing device, and the like.

Data store 232 can be physically implemented within any type of hardware including, but not limited to, a magnetic disk, an optical disk, a semiconductor memory, a digitally encoded plastic memory, a holographic memory, or any other recording medium. Data store 232 can be stand-alone storage units as well as a storage unit formed from a plurality of physical devices, which may be remotely located from one another. Additionally, information can be stored within the data store 232 in a variety of manners. For example, information can be stored within a database structure or can be stored within one or more files of a file storage system, where each file may or may not be indexed for information searching purposes.

Figure 3:
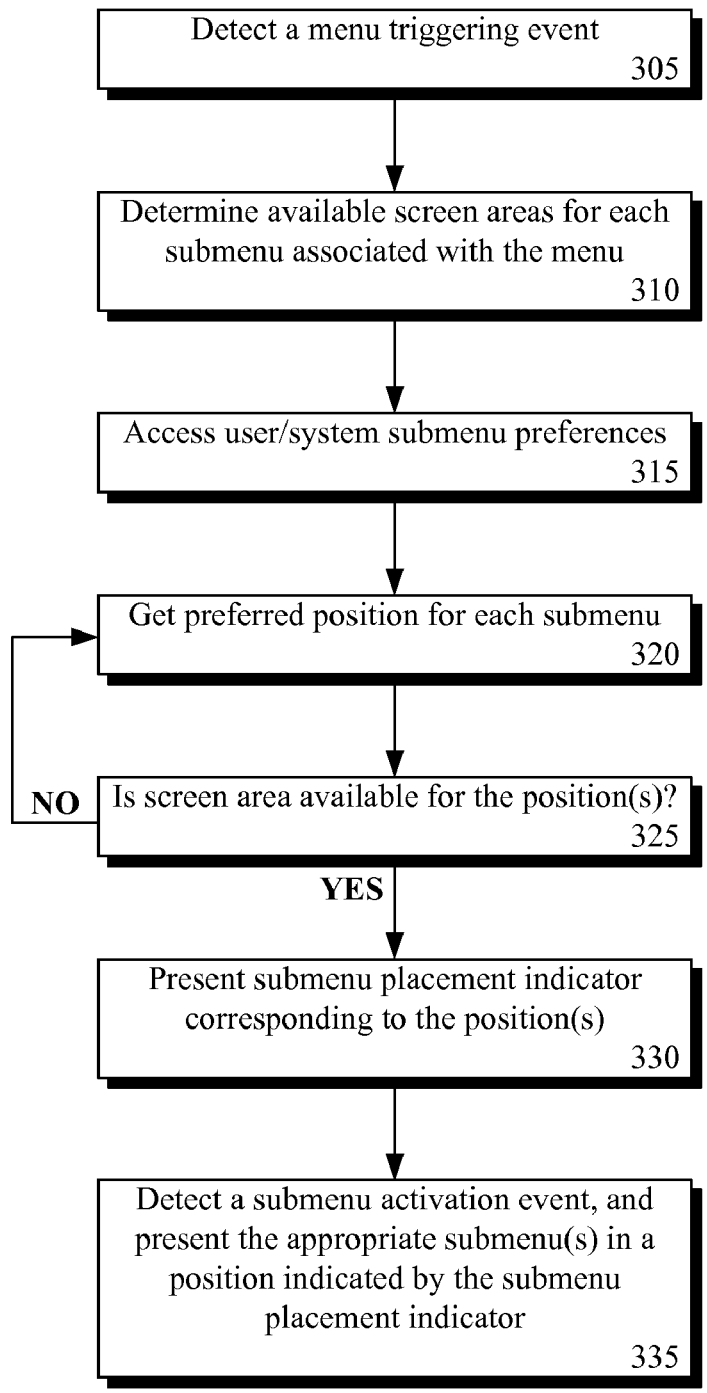
FIG. 3 is a flowchart illustrating a method for dynamically presenting different menu position indicators to properly predict a placement of a related menu in accordance with the embodiment of inventive arrangements disclosed herein.

FIG. 3 is a flowchart illustrating a method 300 for dynamically presenting different menu position indicators to properly predict a placement of a related menu in accordance with the embodiment of inventive arrangements disclosed herein. Method 300 can occur in context of system 200 and can represent a method performed for scenarios 110-140.

The method 300 can begin in step 305, where a graphical user interface (GUI) can detect a menu triggering event, which presents a main menu having at least one submenu option associated with it. Each option can include a menu position indicator to indicate where the associated submenu is to be positioned relative to the main menu when activated. In step 310, available screen areas for each submenu to be presented can be determined. In step 315, user/system preferences for menus/submenus can be accessed within which previously established preferences for menu behavior can be stored. In step 320, the preferred position for the submenu(s) can be determined from retrieved preferences. In step 325, if there is not enough screen area to present the set of submenus in the preferred position, the method can return to step 320, where a next lower presentation preference for the set of submenus can be determined. When sufficient screen space exists for presenting each submenu, the current placement position can be used. A menu position indicator consistent with the current placement position(s) can be presented in the main menu, as shown by step 330. In step 335, a submenu triggering event can be detected, which causes the submenu(s) associated with the menu position indicator to appear in a position indicated by the menu position indicator.

It should be appreciated that details relating to the menu/submenu behavior can dynamically change depending on previous actions and/or a menu/submenu state. For example, a main menu can include multiple submenus, which are to be presented below a main menu (e.g., scenario 130) when activated according to preferred menu behavior settings. Even though sufficient vertical screen area (step 310) may be available (step 325) for a first submenu expansion, sufficient vertical screen area space may not be available for a second submenu expansion, since the first expansion reduces the screen area available (step 310). This can cause method 300 to present the first expansion vertically (e.g., scenario 130) and the second submenu expansion in a different manner (e.g., scenario 110, 120, or 140). Other configurable behavior can also be established (i.e., both the first and second submenu expansion behavior can change so that space is available; the first submenu can be automatically contracted to allow the second submenu to be expanded vertically; and the like) within method 300 to handle different menu related situations.

In another example, a submenu can include child submenus, which are each associated with expansion options. As a submenu expands, such as to the right as shown in scenario 110) screen space may be unavailable for further expansions to the right, which can cause submenus that are children of the expanded submenu to behave in accordance with a different scenario 120, 130, or 140 (expanding to the left, below, or above, respectively) depending on available screen areas and configured preferences.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for presenting menu indicators that predict a placement of a variably placed menu comprising:
   identifying a graphical user interface menu having a plurality of placement positions depending upon available display space relative to a point of origin, wherein each of the plurality of placement positions is associated with a different menu placement indicator;
   determining one of the plurality of placement positions based upon a current position of a point of origin within a display region; and
   presenting the menu placement indicator associated with the determined placement position within the display region.

2. The method of claim 1, further comprising:
   detecting a menu event for presenting the graphical user interface menu corresponding to the presented menu placement indicator; and
   presenting the graphical user interface menu within the display region in the determined placement position.

3. The method of claim 1, further comprising:
   determining a graphical user interface event, which changes the point of origin relative to the display region; and
   responsive to the graphical user interface event, repeating said determining and presenting steps.

4. The method of claim 1, wherein menu placement indicators are at least one of an arrow and a triangle indicating a direction in which said associated graphical user interface is to be presented.

5. The method of claim 1, wherein said plurality of placement positions comprise to the right, to the left, above, and below a location that the menu placement indicator is at within the display region.

6. The method of claim 1, wherein said menu placement indicator is an item in an option list of a parent menu, and wherein said graphical user interface menu is a child menu of said parent menu.

7. The method of claim 1, wherein said parent menu is a context menu.

8. The method of claim 7, wherein said point of origin is a point of said context menu.

9. The method of claim 1, further comprising:
   ordering said plurality of placement positions in a preferred order based upon user configured settings.

10. The method of claim 1, wherein said steps of claim 1 are performed by at least one machine in accordance with at least one computer program stored in a computing device, said computer programming having a plurality of code sections that are executable by the at least one machine.

11. A computing system having a displayable graphical user interface (GUI) element comprising:
   a menu placement indicator presented within a graphical user interface, which indicates a direction that an associated menu is to be placed within a display relative to the menu placement indicator when the associated menu is activated, wherein said menu placement indicator is configured to indicate a plurality of different directions depending upon which of a plurality of different possible positions the associated menu is to be placed in when activated.

12. The computing system of claim 11, wherein said plurality of different directions comprise to the right and to the left of the menu placement indicator.

13. The computing system of claim 11, wherein said plurality of different directions comprise above and below the menu placement indicator.

14. The computing system of claim 11, wherein said menu placement indicator is an item in an option list of a parent menu, and wherein said graphical user interface menu is a child menu of said parent menu.

15. The computing system of claim 14, wherein when space within a display region is available to the right of the parent menu to present the child menu, the menu placement icon indicates to the right and said child menu is placed to the right of the parent menu when activated.

16. The computing system of claim 15, wherein when no space in the display region is available to the right of the parent menu to present the child menu, and wherein when space within a display region is available to the left of the parent menu to present the child menu, the menu placement icon indicates to the left and said child menu is placed to the left of the parent menu when activated.

17. The computing system of claim 16, wherein when no space in the display region is available to the left of the parent menu to present the child menu, and wherein when space within a display region is available below said parent menu to present the child menu, the menu placement icon indicates to the bottom and said child menu is placed to below the item in the option list.

18. A computing device having an interface manager comprising:
   software stored in the computing device configured to execute upon said computing device comprising programmatic instructions for determining a position proximate to a main menu that a submenu is able to be placed within space available of a display, wherein said programmatic instructions are configured to situationally determine a plurality of different placement positions for said submenu when said submenu is activated, wherein said programmatic instructions are further configured to present a menu placement indicator proximate to a menu item of said main menu, wherein said menu item is associated with said submenu, and wherein said menu placement indicator is continuously updated to indicate to a user which direction said submenu is to be placed when activated.

19. The computing device of claim 18, wherein said main menu is a context menu, and wherein said menu placement indicator is at least one of an arrow and a triangle indicating a direction in which said submenu is to be presented relative to said menu placement indicator.

* * * * *